US008717883B2

(12) United States Patent
Russell et al.

(10) Patent No.: US 8,717,883 B2
(45) Date of Patent: May 6, 2014

(54) MEDIA GATEWAY HEALTH

(75) Inventors: James N. Russell, Tulsa, OK (US); Ian C. Scott, Owasso, OK (US); Bob E. Taylor, Owasso, OK (US); Roy Curtis Shell, IV, Owasso, OK (US); Kenny M. Hawkins, Tulsa, OK (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 434 days.

(21) Appl. No.: 12/971,700

(22) Filed: Dec. 17, 2010

(65) Prior Publication Data

US 2012/0155297 A1 Jun. 21, 2012

(51) Int. Cl.
*H04L 12/403* (2006.01)

(52) U.S. Cl.
USPC .......................... 370/229; 370/401; 709/235

(58) Field of Classification Search
USPC ................ 370/401, 229, 237, 252; 701/414; 709/235, FOR. 138; 725/96; 379/265.03; 700/236
See application file for complete search history.

(56) References Cited

U.S. PATENT DOCUMENTS

| | | | |
|---|---|---|---|
| 4,050,095 A * | 9/1977 | Pettipher et al. | 718/105 |
| 4,200,771 A * | 4/1980 | Kraushaar et al. | 379/138 |
| 5,249,269 A * | 9/1993 | Nakao et al. | 709/225 |
| 5,425,086 A * | 6/1995 | Hidaka et al. | 379/32.01 |
| 6,115,462 A * | 9/2000 | Servi et al. | 379/221.06 |
| 6,457,143 B1 * | 9/2002 | Yue | 714/43 |
| 6,510,160 B1 * | 1/2003 | Nikuie et al. | 370/412 |
| 6,556,659 B1 * | 4/2003 | Bowman-Amuah | 379/9.04 |
| 6,678,250 B1 * | 1/2004 | Grabelsky et al. | 370/241 |
| 6,747,957 B1 * | 6/2004 | Pithawala et al. | 370/252 |
| 6,856,613 B1 * | 2/2005 | Murphy | 370/352 |
| 7,013,255 B1 * | 3/2006 | Smith, II | 703/21 |
| 7,380,010 B1 * | 5/2008 | Oran | 709/227 |
| 7,477,646 B1 * | 1/2009 | Peterson et al. | 370/401 |
| 7,512,068 B1 * | 3/2009 | Ghaderi Dehkordi et al. | 370/230 |
| 7,738,377 B1 * | 6/2010 | Agostino et al. | 370/233 |
| 2002/0002443 A1 * | 1/2002 | Ames et al. | 702/188 |
| 2002/0107021 A1 * | 8/2002 | Ishikawa et al. | 455/436 |
| 2002/0152305 A1 * | 10/2002 | Jackson et al. | 709/224 |
| 2003/0027574 A1 * | 2/2003 | Watanabe et al. | 455/435 |
| 2003/0028643 A1 * | 2/2003 | Jabri | 709/226 |
| 2003/0120764 A1 * | 6/2003 | Laye et al. | 709/223 |
| 2003/0152032 A1 * | 8/2003 | Yanagihara et al. | 370/236.1 |
| 2003/0161265 A1 * | 8/2003 | Cao et al. | 370/229 |
| 2003/0179712 A1 * | 9/2003 | Kobayashi et al. | 370/249 |
| 2003/0200337 A1 * | 10/2003 | Jabri et al. | 709/246 |
| 2004/0008111 A1 * | 1/2004 | Chernoguzov et al. | 340/506 |
| 2004/0022203 A1 * | 2/2004 | Michelson et al. | 370/282 |
| 2004/0039706 A1 * | 2/2004 | Skowron et al. | 705/51 |
| 2004/0064760 A1 * | 4/2004 | Hicks et al. | 714/43 |
| 2004/0087311 A1 * | 5/2004 | Haglund | 455/453 |
| 2004/0163079 A1 * | 8/2004 | Noy et al. | 717/154 |
| 2004/0230858 A1 * | 11/2004 | Susskind | 714/1 |
| 2004/0240389 A1 * | 12/2004 | Bessis et al. | 370/252 |
| 2005/0007993 A1 * | 1/2005 | Chambers et al. | 370/349 |
| 2005/0047340 A1 * | 3/2005 | Babiarz et al. | 370/231 |
| 2005/0122985 A1 * | 6/2005 | Murphy | 370/401 |

(Continued)

*Primary Examiner* — Paul H Masur
*Assistant Examiner* — Michael Phillips

(57) ABSTRACT

Data is received from a media gateway relating to a congestion level in the media gateway. In a computer having a processor and a memory, at least a first datum and a second datum included in the data are evaluated. Based on the evaluation, it is determined whether the congestion level exceeds a predetermined level. The congestion level is reported, including whether the congestion level exceeds the predetermined level.

24 Claims, 3 Drawing Sheets

(56) References Cited

U.S. PATENT DOCUMENTS

| | | | |
|---|---|---|---|
| 2005/0216729 A1* | 9/2005 | Joels et al. | 713/153 |
| 2006/0069621 A1* | 3/2006 | Chang et al. | 705/26 |
| 2006/0171418 A1* | 8/2006 | Casini et al. | 370/474 |
| 2006/0221876 A1* | 10/2006 | Kosanovic et al. | 370/286 |
| 2006/0221974 A1* | 10/2006 | Hilla et al. | 370/394 |
| 2006/0224252 A1* | 10/2006 | Brindac et al. | 700/18 |
| 2006/0251050 A1* | 11/2006 | Karlsson | 370/352 |
| 2007/0014276 A1* | 1/2007 | Bettink et al. | 370/351 |
| 2007/0036079 A1* | 2/2007 | Chowdury et al. | 370/235 |
| 2007/0083650 A1* | 4/2007 | Collomb et al. | 709/224 |
| 2007/0099600 A1* | 5/2007 | Patterson et al. | 455/415 |
| 2007/0099620 A1* | 5/2007 | Patterson et al. | 455/445 |
| 2007/0110219 A1* | 5/2007 | Wu et al. | 379/13 |
| 2007/0233896 A1* | 10/2007 | Hilt et al. | 709/238 |
| 2008/0002576 A1* | 1/2008 | Bugenhagen et al. | 370/229 |
| 2008/0049757 A1* | 2/2008 | Bugenhagen | 370/395.1 |
| 2008/0049769 A1* | 2/2008 | Bugenhagen | 370/401 |
| 2008/0165789 A1* | 7/2008 | Ansari et al. | 370/401 |
| 2008/0170508 A1* | 7/2008 | Popiak et al. | 370/252 |
| 2008/0177874 A1* | 7/2008 | Mullarkey | 709/223 |
| 2008/0255953 A1* | 10/2008 | Chang et al. | 705/14 |
| 2008/0288584 A1* | 11/2008 | Colantuono et al. | 709/203 |
| 2008/0299963 A1* | 12/2008 | Balachandran et al. | 455/422.1 |
| 2009/0064248 A1* | 3/2009 | Kwan et al. | 725/109 |
| 2009/0103524 A1* | 4/2009 | Mantripragada et al. | 370/352 |
| 2009/0138588 A1* | 5/2009 | Qian et al. | 709/224 |
| 2009/0182594 A1* | 7/2009 | Choubey | 705/7 |
| 2009/0201808 A1* | 8/2009 | Bettink et al. | 370/230 |
| 2009/0264135 A1* | 10/2009 | Patterson et al. | 455/445 |
| 2010/0027420 A1* | 2/2010 | Smith | 370/235 |
| 2010/0054426 A1* | 3/2010 | Skoglund | 379/33 |
| 2010/0069049 A1* | 3/2010 | Patterson et al. | 455/414.1 |

* cited by examiner

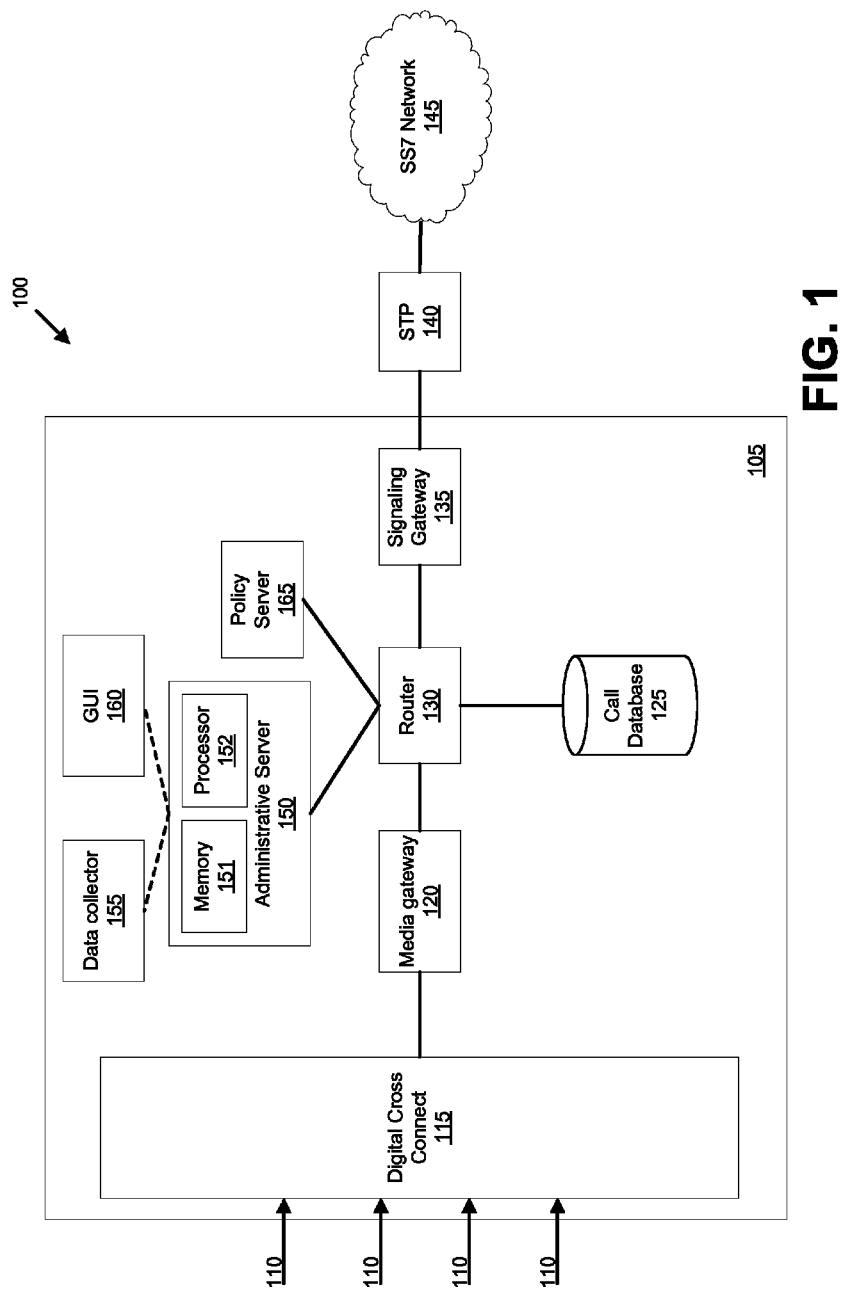

Fig. 2

| Gateway ID 205 | Shelf ID 210 | Slot ID 215 | MC Level 220 | CPU Level 225 | Memory Level 230 | Call rate Level 235 | ICM Level 240 | MC Duration 245 | Call arrival rate 250 | Call accept % 255 | Call accept rate 260 |
|---|---|---|---|---|---|---|---|---|---|---|---|

| Gateway ID 205 | Shelf ID 210 | Adaptive MC Level 305 | Overload gain factor 310 | Resample interval 315 | Resource avg. factor 320 | Policer state 325 | Policer bucket size 330 | Policer nonpriority threshold 340 |
|---|---|---|---|---|---|---|---|---|

| Gateway ID 205 | MC1 count 405 | MC1 total time 410 | MC2 count 415 | MC2 total time 420 | MC3 count 425 | MC3 total time 430 | Call arrivals 435 | Gateway calls rejected 440 | Policy svr calls rejected 445 | Avg. call rate 450 | Peak call rate 455 |
|---|---|---|---|---|---|---|---|---|---|---|---|

400

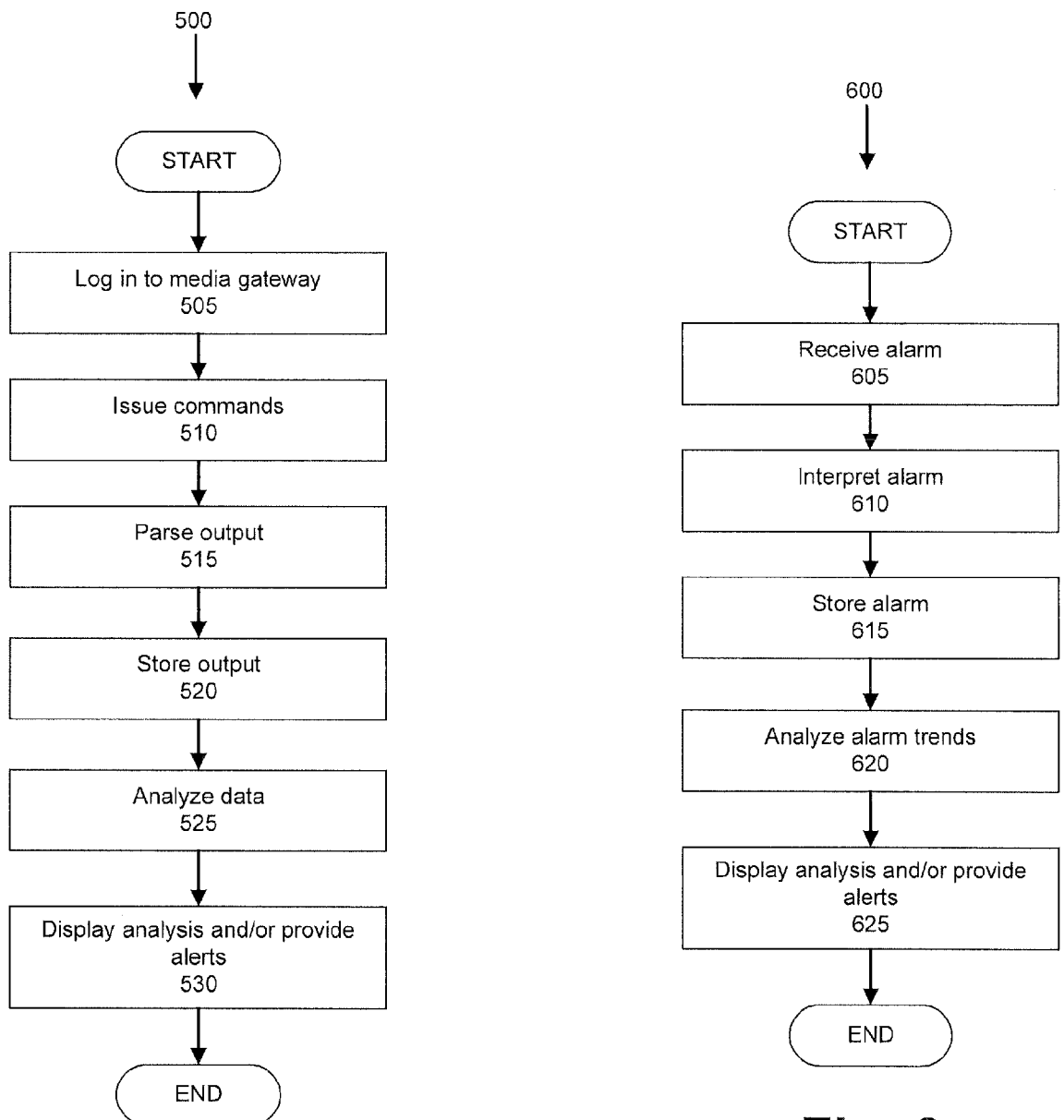

MEDIA GATEWAY HEALTH

BACKGROUND INFORMATION

A media gateway may be used for routing network traffic, e.g., calls. For example, a media gateway may be used, in conjunction with a policy server, to determine a destination for an incoming call, and to route packets associated with the incoming call to an appropriate destination. The destination may be associated with a particular customer or user. The customer may be served by a set of one or more trunks, each trunks including one or more links, e.g., Trunk Level 1 (T-1) links. Unfortunately, mechanisms are presently lacking for evaluating the health of a media gateway, e.g., for identifying and analyzing congestion events.

BRIEF DESCRIPTION OF THE DRAWINGS

FIG. 1 illustrates an exemplary call processing system.

FIG. 2 illustrates an exemplary set of data that may be obtained from a media gateway by querying the gateway to show, in real-time or near real-time, congestion related information for a shelf in the gateway.

FIG. 3 illustrates an exemplary set of data that may be obtained from a media gateway by querying the gateway to show certain elements of the gateway's configuration.

FIG. 4 illustrates an exemplary data set that includes elements showing statistics obtained from a gateway relating to congestion over a given period of time.

FIG. 5 illustrates an exemplary process for obtaining data from a media gateway.

FIG. 6 illustrates an exemplary process for receiving and analyzing alarm data from a media gateway.

DETAILED DESCRIPTION OF PREFERRED EMBODIMENTS

FIG. 1 illustrates an exemplary system 100 for processing calls that includes a call hub 105, e.g., a central office or the like for switching and routing telecommunications. Incoming calls 110 from telecommunication network carriers, e.g., from time division multiplex (TDM) networks, are received in the call hub 105 in a digital cross connect (DCC) 115. The call hub 105 includes at least one media gateway 120, and generally includes multiple media gateways 120, although only one media gateway 120 is illustrated and discussed herein for convenience. The media gateway 120 receives a TDM call 110 from DCC 115, and provides a stream of packets for the call 110 to be routed by a router 130 according to instructions provided to the media gateway 120 by a policy server 165. Records relating to calls 110 may be stored in a call database 125. A signaling gateway 135 receives signaling information for call setup from the router 130, serving as an interface between the call hub 105 and a signaling system 7 (SS7) network 145. A signal transfer point 140 sends and receives signaling information to and from the signaling gateway 135 and the network 145 for setup of calls 110.

As described herein, the health of one or more media gateways 120 included in the call hub 105 may be monitored. For example, metrics relating to congestion in a media gateway 120 may be monitored. In general, congestion in a media gateway 120 is defined as the condition that arises when the media gateway 120 is presented with traffic in excess of available bandwidth. Depending on its severity, a congestion condition can cause the quality of a data transmission, e.g., a call, to be degraded to varying degrees, or even terminated.

DCC 115 is well known for providing lines that carry voice and data signals. As is known, lines are connected to ports in DCC 115, and DCC 115 allows users to digitally, rather than manually, connect lines by providing commands indicating which ingress and egress ports in DCC 115 are to be connected to one another.

Media gateway 120 generally includes what is generally referred to as a media gateway and media gateway controller. For example, in one implementation, media gateway 120 is the GSX9000 High-Density Media Gateway sold by Sonus Networks, Inc. of Westford, Mass. Media gateway 120 may receive TDM calls 110, and provide the calls 110 to router 130 according to Internet protocol (IP). Although only one media gateway 120 is shown in FIG. 1, the system 100 generally includes multiple media gateways 120.

Database 125 is generally a relational database or the like for receiving and storing records related to calls 110. The database 125 generally includes instructions stored on a computer readable medium and executable by a computer processor for storing, processing, and providing records, e.g., in response to queries.

Router 130 provides internal and external routing functionality in a packet network. For example, in one implementation, the router 130 performs operations for both Open System Interconnect (OSI) Layers 2 and 3, thus operating as both an Ethernet switch and a network router. Although only one router 130 is shown in FIG. 1, the system 100 generally includes multiple routers 130.

The signaling gateway 135 allows the media gateway 120 to interface with the SS7 network 145. For example, in one implementation, signaling gateway 135 is the SGX4000 Universal Signaling Gateway sold by Sonus Networks, Inc. Signaling gateway 135 provides interfaces for signaling according to protocols associated with the SS7 network 145, including Integrated Services Digital Network User Part (ISUP) and Transactional Capabilities Application Part (TCAP). Thus, signaling gateway 135 terminates links from SS7 network 145, and converts ISUP messages to IP messages and accordingly provides IP links in the direction of router 130.

Signal transfer point (STP) 140 is a conventional signal transfer point for use in an SS7 network. Thus, STP 140 includes a packet switch for transferring messages between call hub 105, and nodes in the SS7 network 145.

Administrative server 150 may include a memory 151, a processor 152 and instructions stored on computer readable media of one or more computing devices, and may be used for various operations in call hub 105. For example, the administrative server 150 may include a data collector 155, i.e., script, software application, etc., for gathering and analyzing information from media gateway 120, as discussed further below. Further, administrative server 150 may be configured to provide a graphical user interface (GUI) 160, such as a webpage or the like. Administrative server 150 may also, e.g., via GUI 160 or some other interface, provide a mechanism for a user to query media gateway 120, and receive data from media gateway 120 concerning call transfer operations.

Policy server 165 provides policy and routing services for media gateway 120. For example, the policy server 165 includes a database of signaling addresses for routing calls 110, and may receive signaling information from the media gateway 120, and provide instructions to the media gateway 120 on how to establish a call 110.

FIG. 2 illustrates an exemplary set of data 200 that may be obtained from a media gateway 120 by querying the gateway 120 to show, in real-time or near real-time, congestion related information for a shelf in the gateway 120. Media gateway ID 205 is an identifier for a media gateway 120 from which the data set 200 was obtained. Media gateway ID 205 is utilized because call hub 105 generally includes multiple media gateways 120.

Shelf ID 210 and slot ID 215 identify particular locations in the media gateway 120. Shelf ID 210 identifies a particular shelf in the media gateway. Slot ID 215 identifies a slot in the identified shelf.

MC level 220 specifies a congestion level experienced by the media gateway 120. For example, congestion levels may be indicated by integers ranging from 0 to 3, where 0 indicates no congestion, and 3 indicates a highest level of congestion.

CPU level 225 specifies a level of utilization of a central processing unit (CPU) or units in media gateway 120, e.g., according to integers ranging from 0 to 3, where 0 indicates no CPU usage and 3 indicates a highest level of CPU usage, e.g., 100% or near 100% usage.

Memory level 230 indicates a level of usage of a memory in the media gateway 120, e.g., according to integers ranging from 0 to 3, where 0 indicates no memory usage and 3 indicates a highest level of memory usage, e.g., 100% or near 100% usage.

Call rate level 235 indicates a level of a rate at which calls are presented to the media gateway 120. For example, call rate level 235 may be expressed in a range of 0 to 3, where 0 indicates no calls are being presented, and 3 indicates a highest call rate level.

ICM level 240 indicates a level of inter-card messaging within the gateway 120. Inter-card messaging refers to messaging between the circuit cards within the media gateway 120. For example, ICM level 240 may be expressed in a range of 0 to 3, where 0 indicates no messaging, and 3 indicates a highest level of messaging.

MC duration 245 indicates, e.g., in seconds, a period of time for which the presently reported congestion level, i.e., MC level 220, has been present in the media gateway 120.

Call arrival rate 250 provides a rate at which calls are arriving in the gateway 120, e.g., in terms of calls per second.

Call accept percentage 255 indicates a percentage of calls provided to the gateway 124 switching that are accepted by the gateway 120. Call except percentage 255 may be computed by dividing call except rate 260, discussed in the next paragraph by call arrival rate 250, discussed in the preceding paragraph.

Call accept rate 260 indicates a rate at which calls are being accepted in the gateway 120. For example, call accept rate 260 may be expressed in terms of a number of calls being accepted per second.

Some or all of the foregoing elements of the data set 200 may be stored in database 125. Further, various logic may be applied to these elements to evaluate the health of the gateway 120. For example, in one implementation, data collector 155 collects the data set 200 from media gateway 120 on a periodic basis. Data collector 155 may store the data set 200 in database 125, and may further evaluate elements of the data set 200. For example, if the data collector 155 determines that any of MC level 220, CPU level 225, memory level 230, or ICM level 240 are not zero, or if call accept percentage 255 is not 100%, a poor health condition may be noted, and further an alert, e.g., an indication in GUI 160, an e-mail or other message to an administrator, etc., may be provided.

FIG. 3 illustrates an exemplary set of data 300 that may be obtained from a media gateway 120 by querying the gateway 120 to show certain elements of a configuration of the gateway 120. The record 300 includes a gateway ID 205, and a shelf ID 210, as discussed above with respect to FIG. 2.

The record 300 includes adaptive MC level 305, which indicates an MC level 220 at which the gateway 120 begins to manage for a congestion condition. Managing for a congestion condition could include dropping data packets or terminating calls altogether.

Overload gain factor 310 specifies a numeric value, generally an integer ranging from one to ten, for system overload gain. Overload gain factor 310 is used to optimize the traffic load that a media gateway 120 will accept. Higher values result in a faster decrease in accepted load, i.e. the system will be more aggressive in rejecting traffic. In an exemplary implementation a default value for overload gain factor 310 is three.

Resample interval 315 specifies a period of time, e.g., in seconds, over which the gateway 120 is re-computing metrics related to congestion and utilization, e.g., metrics discussed above with respect to data set 200. For example, by default, the media gateway 120 used in an exemplary implementation maintains four 15-minute intervals of data, so that at any time the previous hour of data is available. Resample interval 315 is accordingly important in determining a frequency with which the media gateway 120 should be queried.

Resource average factor 320 specifies an influence that previous internal averages (rather than a current sample) have on computations of average utilization of CPU and memory in a media gateway 120. In an exemplary implementation, possible values for resource average factor range from zero to one hundred, and a default value is 30.

Policer state 325 may have a value of either "enabled" or "disabled." The congestion policer of a media gateway 120 is a mechanism for ensuring that the gateway 120 accepts calls at a smooth rate. Otherwise, the gateway 120 might accept all calls for a short period of time and then reject all calls for the remainder of a sampling period.

Policer bucket state 330 specifies a control call burst handling capability of a media gateway 120 in terms of a number of calls that may be included in a burst. For example, if policer bucket state 330 is set to "20," and no calls were received in the last one second, a congestion policer in a media gateway 120 will allow a burst of 20 calls.

Policer nonpriority threshold 335 is an indicator for whether preference should be given to emergency calls, and in one exemplary implementation may have a value of zero or one, and is generally set to zero, meaning that nonpriority and emergency calls are given equal priority.

FIG. 4 illustrates an exemplary data set 400 that includes elements showing statistics obtained from a gateway 120 relating to congestion over a given period of time. The data set 400 includes a gateway ID 205, as discussed above.

The data set 400 further includes an MC1 (congestion level 1) count 405. The count 405 represents a number of times that MC level 220 has had a value of 1.

MC1 total time 410 indicates a total amount of time in the given period of time that MC1 level 220 has had a value of 1.

MC2 (congestion level 2) count 415 represents a number of times in the given period of time that MC level 220 has had a value of 2.

MC2 total time 420 indicates a total amount of time in the given period of time that MC level 220 has had a value of 2.

MC3 (congestion level 3) count 425 represents a number of times in the given period of time that MC level 220 has had a value of 3.

MC3 total time 420 indicates a total amount of time in the given period of time that MC level 220 has had a value of 3.

Call arrivals 435 indicates a number of calls received in the media gateway 120 in the given period of time.

Gateway calls rejected 440 indicates a number of calls that the media gateway 120 has rejected in the given period of time.

Policy server calls rejected 445 indicates a number of calls that the policy server 165 has rejected in the given period of time.

Average call rate 450 indicates an average number of calls received in a period of time, e.g., an average number of calls per second, in the gateway 120 in the given period of time.

Peak call rate 455 indicates a maximum number of calls received in a period of time within the given period of time, e.g., a maximum number of calls received in a 1 second interval in the given period of time.

Some or all of the foregoing elements of the data set 400 may be stored in database 125. Further, various logic may be applied to these elements to evaluate the health of the gateway 120. For example, in one implementation, data collector 155 collects the data set 400 from media gateway 120 on a periodic basis. Data collector 155 may store the data set 400 in database 125, and may further evaluate elements of the data set 400. For example, if the data collector 155 determines that any of MC1 count 405, MC1 total time 410, MC2 count 415, MC2 total time 420, MC3 count 425, MC3 total time 430, gateway calls rejected 440, or policy server calls rejected 445, are greater than zero, a poor health condition may be noted, and further an alert, e.g., an indication in GUI 160, an e-mail or other message to an administrator, etc., may be provided.

A poor health condition may further be noted based on some other combination of conditions of data sets 200 and/or 400 other than discussed above. For example, data sets 200 and/or 400 could be combined, and a poor health condition could be noted based on values of one or more elements in the combined data set, or based on multiple values from one or both of the data sets 200 and 400.

FIG. 5 illustrates an exemplary process 500 for obtaining data sets 200, 300, and 400. Process 500 is generally conducted periodically to obtain the data sets 200, 300, and/or 400 from a media gateway 120. The process 500 begins in a step 505, in which data collector 155 logs in to the media gateway 120. Note that if call hub 105 includes multiple media gateways 120, the process 500 may be periodically conducted with respect to each of them.

After step 505, in step 510, the data collector 155 issues commands to the media gateway 120. For example, the media gateway 120 may be configured to receive predetermined queries or other commands to obtain data. Accordingly, in this step 510, the data collector 155 may issue commands to obtain some or all of data sets 200, 300, and/or 400.

Next, in step 515, data collector 155 parses the output received from the media gateway 120 in response to the command provided in step 510. For example, such outputs may be staged in a text file or the like, and parsed by data collector 155 according to predetermined rules, e.g., looking for delimiting characters, identifying characters indicating the start of certain fields, etc.

Next, in step 520, data collector 155 stores the data parsed in step 515, e.g., in database 125. Storage of the data in a nonvolatile data store such as database 125 is optional, but recommended, inasmuch as it is often useful to have the data available for later analysis, and potentially for use in trend analysis. For example, data collector 155 may determine if a media gateway 120 has been inaccessible more than a given number of times in a given period of time, whether congestion associated with a media gateway 120 has increased or been at a given level over time, etc. In general, data collector 155 may identify and report one or more trends relating to some or all of the elements in records 200, 300, and 400 over a period of time.

Next, in step 525, data collector 155 analyzes the data obtained and parsed as described above. For example, analysis of data sets 200, 300, and/or 400 may seek to identify poor health conditions, e.g., congestion conditions, in the media gateway 120 as described above.

Next, in step 530, data collector 155 causes results of the analysis performed in step 525 to be provided to one or more users, e.g., via GUI 160, e-mail or message alerts, etc. Further, the manner in which information is provided to users may be determined according to the results of the analysis. For example, if a poor health condition is identified, an e-mail or text message may be provided, whereas if a health condition is noted but is not a poor health condition, simply making information available upon user request via GUI 160 may be adequate.

Following step 530, process 500 ends.

FIG. 6 illustrates an exemplary process 600 for receiving and analyzing alarm data from a media gateway 120. The process 600 begins in a step 605 in which data collector 155 receives an alarm from and/or concerning a media gateway 120. For example, an alarm may indicate that a media gateway 120 cannot be accessed, is experiencing a severe congestion level, etc.

Next, in step 610, data collector 155 interprets the alarm, e.g., parses the alarm information received, compares an alarm code to a value in a lookup table, etc., as necessary.

Next, in step 615, the alarm data parsed in step 610 is stored, e.g., in database 125.

Next, in step 620, data collector 155 analyzes the alarm data stored in step 615, e.g., to determine one or more trends associated with the data. For example, data collector 155 may determine if a media gateway 120 has been inaccessible more than a given number of times in a given period of time, whether congestion associated with a media gateway 120 has increased or been at a given level over time, etc. In general, data collector 155 may provide output, e.g., as discussed with respect to step 625 below, relating to a number of alarms reported in a given time period, e.g., in a given day, with respect to a media gateway 120.

Next, in step 625, data collector 155 causes results of the analysis performed in step 525 to be provided to one or more users, e.g., via GUI 160, e-mail or message alerts, etc. Further, the manner in which information is provided to users may be determined according to the results of the analysis. For example, if a poor health condition is identified, an e-mail or text message may be provided, whereas if a health condition is noted but is not a poor health condition, simply making information available upon user request via GUI 160 may be adequate.

Following step 625, the process 600 ends.

Computing devices such as those disclosed herein may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method, comprising:
    retrieving data from a media gateway relating to a congestion level in the media gateway, the data including a first set of data including congested related information for a shelf in the media gateway and a second set of data relating to congestion in the media gateway over a given period of time;
    evaluating, in a computer having a processor and a memory, at least a first datum included in the first set of data and a second datum included in the second set of data;
    based on the evaluation, determining whether the congestion level exceeds a predetermined level identifying a poor health condition of the media gateway; and
    reporting the congestion level, including whether the congestion level exceeds the predetermined level.

2. The method of claim 1, wherein the first datum and the second datum are each one of the congestion level, a central processing unit (CPU) level, a memory level, a call rate level, and inter-card messaging (ICM) level, a congestion duration, a call arrival rate, a call acceptance percentage, a call acceptance rate, a congestion level 1 count, a congestion level 1 total time, a congestion level 2 count, a congestion level 2 total time, a congestion level 3 count, a congestion level 3 total time, a number of call arrivals, a number of gateway calls rejected, a number of policy server calls rejected, an average call rate, and a peak call rate.

3. The method of claim 1, further comprising receiving an alarm code from the media gateway and using the alarm code to identify an alarm condition.

4. The method of claim 1, further comprising receiving a plurality of alarm codes from the media gateway at different times in a period of time and using the plurality of alarm codes to identify a trend in usage of the media gateway.

5. The method of claim 4, wherein the trend is one of accessibility of the media gateway and congestion in the media gateway over the period of time.

6. The method of claim 1, further comprising receiving additional sets of data at periodic intervals, and using the data and the additional sets of data to identify a trend in usage of the media gateway.

7. The method of claim 6, wherein the trend is one of accessibility of the media gateway and congestion in the media gateway.

8. The method of claim 1, wherein the data received from the media gateway includes a set of data indicative of a configuration of the gateway, and further comprising determining the predetermined level according to the set of data indicative of the configuration of the gateway.

9. A system, comprising:
    a computer having a processor and a memory, the computer configured to:
    retrieve data from a media gateway relating to a congestion level in the media gateway, the data including a first set of data including congested related information for a shelf in the media gateway and a second set of data relating to congestion in the media gateway over a given period of time;
    evaluate at least a first datum included in the first set of data and a second datum included in the second set of data;
    based on the evaluation, determine whether the congestion level exceeds a predetermined level identifying a poor health condition of the media gateway; and report the congestion level, including whether the congestion level exceeds the predetermined level.

10. The system of claim 9, wherein the first datum and the second datum are each one of the congestion level, a central processing unit (CPU) level, a memory level, a call rate level, and inter-card messaging (ICM) level, a congestion duration, a call arrival rate, a call acceptance percentage, a call acceptance rate, a congestion level 1 count, a congestion level 1 total time, a congestion level 2 count, a congestion level 2 total time, a congestion level 3 count, a congestion level 3 total time, a number of call arrivals, a number of gateway calls rejected, a number of policy server calls rejected, an average call rate, and a peak call rate.

11. The system of claim 9, the computer further configured to receive an alarm code from the media gateway and to use the alarm code to identify an alarm condition.

12. The system of claim 9, the computer further configured to receive a plurality of alarm codes from the media gateway at different times in a period of time and to use the plurality of alarm codes to identify a trend in usage of the media gateway.

13. The system of claim 12, wherein the trend is one of accessibility of the media gateway and congestion in the media gateway over the period of time.

14. The system of claim 9, the computer further configured to receive additional sets of data at periodic intervals, and to use the data and the additional sets of data to identify a trend in usage of the media gateway.

15. The system of claim 14, wherein the trend is one of accessibility of the media gateway and congestion in the media gateway.

16. The system of claim 9, wherein the data received from the media gateway includes a set of data indicative of a configuration of the gateway, and further comprising determining the predetermined level according to the set of data indicative of the configuration of the gateway.

17. A non-transitory computer-readable medium including instructions stored thereon, the instructions including instructions for:
retrieving data from a media gateway relating to a congestion level in the media gateway, the data including a first set of data including congested related information for a shelf in the media gateway and a second set of data relating to congestion in the media gateway over a given period of time;
evaluating, in a computer having a processor and a memory, at least a first datum included in the first set of data and a second datum included in the second set of data;
based on the evaluation, determining whether the congestion level exceeds a predetermined level identifying a poor health condition of the media gateway; and
reporting the congestion level, including whether the congestion level exceeds the predetermined level.

18. The medium of claim 17, wherein the first datum and the second datum are each one of the congestion level, a central processing unit (CPU) level, a memory level, a call rate level, and inter-card messaging (ICM) level, a congestion duration, a call arrival rate, a call acceptance percentage, a call acceptance rate, a congestion level 1 count, a congestion level 1 total time, a congestion level 2 count, a congestion level 2 total time, a congestion level 3 count, a congestion level 3 total time, a number of call arrivals, a number of gateway calls rejected, a number of policy server calls rejected, an average call rate, and a peak call rate.

19. The medium of claim 17, the instructions further comprising instructions for receiving an alarm code from the media gateway and using the alarm code to identify an alarm condition.

20. The medium of claim 17, the instructions further comprising instructions for receiving a plurality of alarm codes from the media gateway at different times in a period of time and using the plurality of alarm codes to identify a trend in usage of the media gateway.

21. The medium of claim 20, wherein the trend is one of accessibility of the media gateway and congestion in the media gateway over the period of time.

22. The medium of claim 17, the instructions further comprising instructions for receiving additional sets of data at periodic intervals, and using the data and the additional sets of data to identify a trend in usage of the media gateway.

23. The medium of claim 22, wherein the trend is one of accessibility of the media gateway and congestion in the media gateway.

24. The medium of claim 17, wherein the data received from the media gateway includes a set of data indicative of a configuration of the gateway, and further comprising determining the predetermined level according to the set of data indicative of the configuration of the gateway.

* * * * *